United States Patent [19]

Law et al.

[11] Patent Number: 6,085,856

[45] Date of Patent: Jul. 11, 2000

[54] ATTACHMENT SYSTEM FOR SUSPENSION CRADLE

[75] Inventors: Sinlap Edward Law, West Bloomfield; William L. Clikeman, Waterford, both of Mich.

[73] Assignee: DaimlerChrysler Corporation, Auburn Hills, Mich.

[21] Appl. No.: 09/212,875

[22] Filed: Dec. 16, 1998

[51] Int. Cl.[7] .................................................... B60K 5/00
[52] U.S. Cl. ........................................... 180/291; 280/781
[58] Field of Search ................................... 180/291, 297, 180/311, 312; 280/781, 785

[56] References Cited

U.S. PATENT DOCUMENTS

| | | |
|---|---|---|
| 1,727,804 | 9/1929 | Bell . |
| 2,749,823 | 6/1956 | Mitchell . |
| 4,240,517 | 12/1980 | Harlow, Jr. et al. . |
| 4,392,545 | 7/1983 | Harasaki et al. . |
| 4,449,603 | 5/1984 | Langwieder et al. . |
| 4,893,779 | 1/1990 | Bergelt . |
| 5,096,010 | 3/1992 | Ojala et al. . |
| 5,472,063 | 12/1995 | Watanabe et al. . |
| 5,772,245 | 6/1998 | Mühlhausen . |

Primary Examiner—Richard M. Camby
Attorney, Agent, or Firm—Lawrence J. Shurupoff

[57] ABSTRACT

A suspension cradle is attached to a rigid frame of an automotive vehicle by towers secured to the ends of the cradle. Each tower is in the form of an upright hollow body having two channel-shaped parts facing one another and secured together. Each tower part has an apertured horizontal flange. The flanges are spaced apart, with the apertures in alignment. A bolt extends through the apertures and threads into a nut on the frame of the vehicle. The bolt, nut, spacer tube and flanges provide a stiff double-shear attachment. The flanges are prevented from collapsing when the bolt is tightened by a spacer tube extending between the flanges and sleeved on the bolt. A third apertured flange through which the spacer tube extends prevents the spacer tube from falling out of the tower during installation, shipping and assembly.

10 Claims, 4 Drawing Sheets

6,085,856

ATTACHMENT SYSTEM FOR SUSPENSION CRADLE

This invention relates generally to a suspension cradle of an automotive vehicle, and more particularly to a system for attaching the suspension cradle to the frame of the vehicle.

BACKGROUND AND SUMMARY OF THE INVENTION

A motor vehicle typically has a suspension cradle for mounting various components such as a stabilizer bar, engine mount and steering gear. In the past the suspension cradle has been bolted or otherwise secured directly to the vehicle frame. This form of attachment has been difficult to reach with existing tools, has been expensive and heavy, and has lacked sufficient stiffness to prevent vibration and noise. What is needed is an attachment system which can be accessed easily with existing tools, provides a stiffer attachment to avoid the development of vibration and noise, and has the advantage of reducing cost and weight.

In accordance with the present invention, an apparatus is provided for attaching a transverse suspension cradle to a vehicle body having a tower rigidly secured to each of the two ends of the cradle and in turn bolted or otherwise rigidly secured to the frame of the vehicle. Each tower is in the form of a vertical hollow body having a pair of vertically spaced flanges with an attaching bolt extending through aligned apertures in the flanges and secured by nuts to the frame of the vehicle. The spaced flanges provide a stiff double-shear attachment which is very rigid and forms a strong enough joint to eliminate or at least substantially reduce vibration and noise.

Preferably each tower is made of two tower parts, each generally of channel form and facing one another to form a hollow body. One of the flanges through which the bolt extends is formed integrally with one of the tower parts and the other flange is formed integrally with the other tower part. The bolt extends through a pocket in one of the tower parts, where it is positioned for easy access by an attaching tool.

In order to prevent the collapse of the two spaced apart flanges when the bolt is tightened, a spacer is provided between the two flanges. The spacer is in the form of a tube sleeved on the bolt. The tube is preferably unattached and free floating to align with the apertures. The tower body preferably has a third apertured flange through which the tube extends to prevent the tube from falling out during assembly and installation.

One object of this invention is to provide apparatus for attaching a transverse suspension cradle to a vehicle body which has a double-shear attachment providing a stiffer joint, thereby reducing, if not altogether eliminating, vibration and noise.

Another object is to provide an attachment system which is formed of a relatively few simple parts, is rugged and durable in use, and can be made with minimum cost and weight.

These and other objects, features and advantages will become more apparent as the following description proceeds, especially when considered with the accompanying drawings.

DETAILED DESCRIPTION OF THE PREFERRED EMBODIMENT

Figure 1:
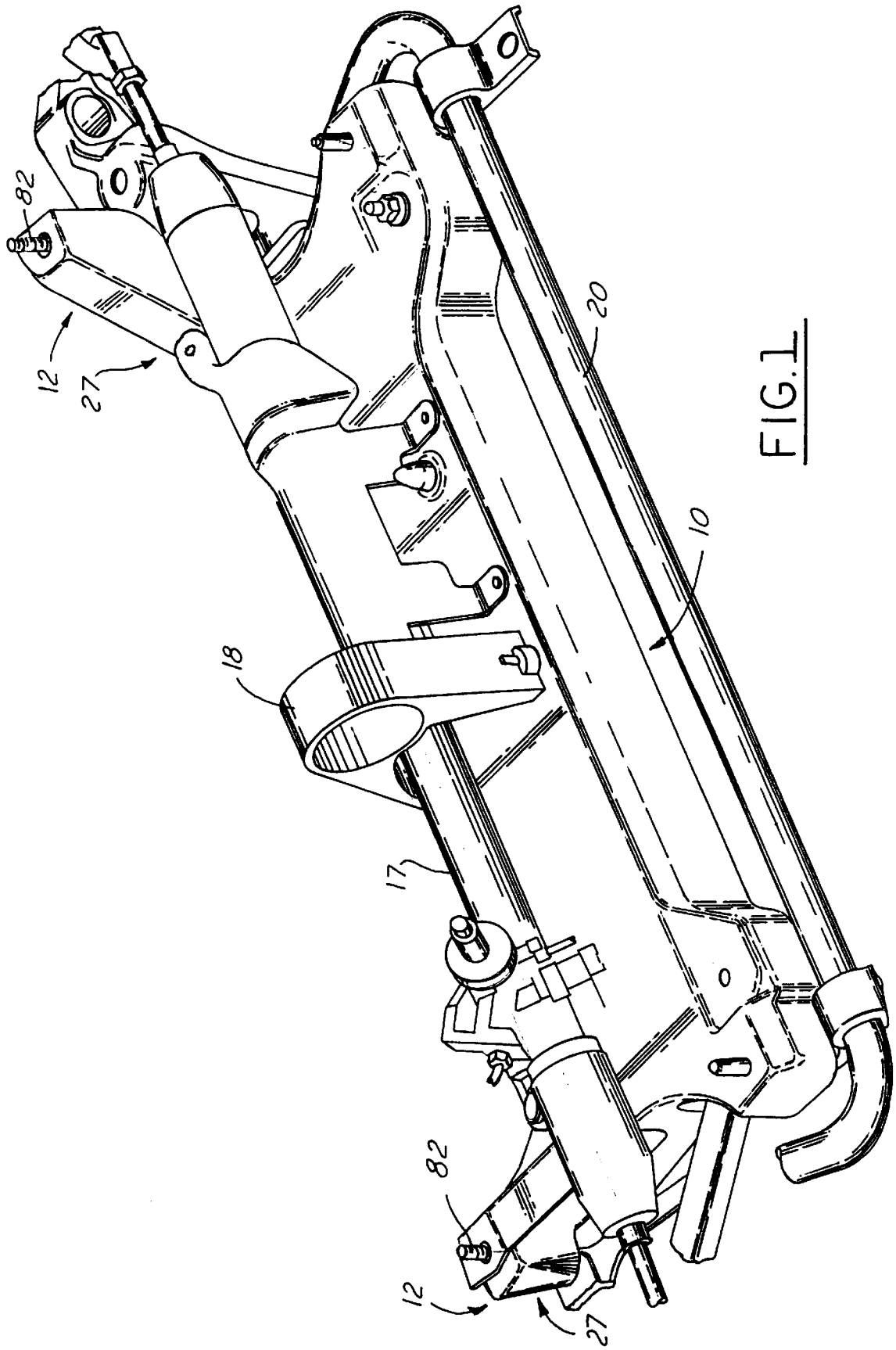
FIG. 1 is a perspective view showing a suspension cradle with a suspension tower at each end of the cradle and with various automotive components mounted on the cradle, all in accordance with the invention.
Figure 2:
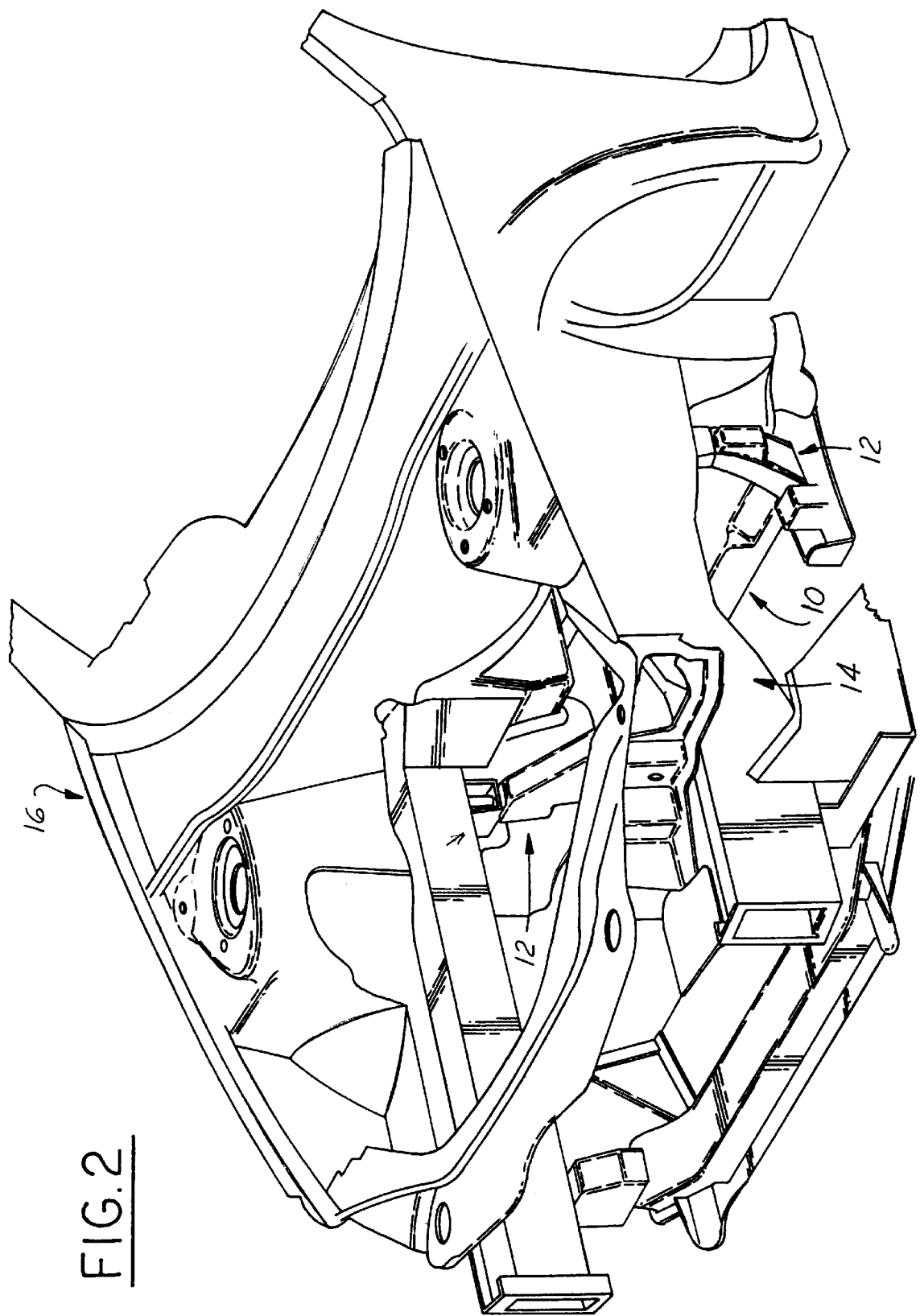
FIG. 2 is a perspective view showing portions of the frame of the front end of a vehicle, with parts broken away to illustrate the suspension cradle and mounting towers and their relationship to the vehicle body.

Referring now more particularly to the drawings, and especially FIGS. 1–3, there is shown an elongated cross-member 10, hereinafter referred to a suspension cradle, having a tower 12 at each end for securing the cradle to a frame 14 of an automotive vehicle 16. The cradle mounts a plurality of engine components, including a steering gear 17, engine mount 18 and stabilizer bar 20.

Figure 3:
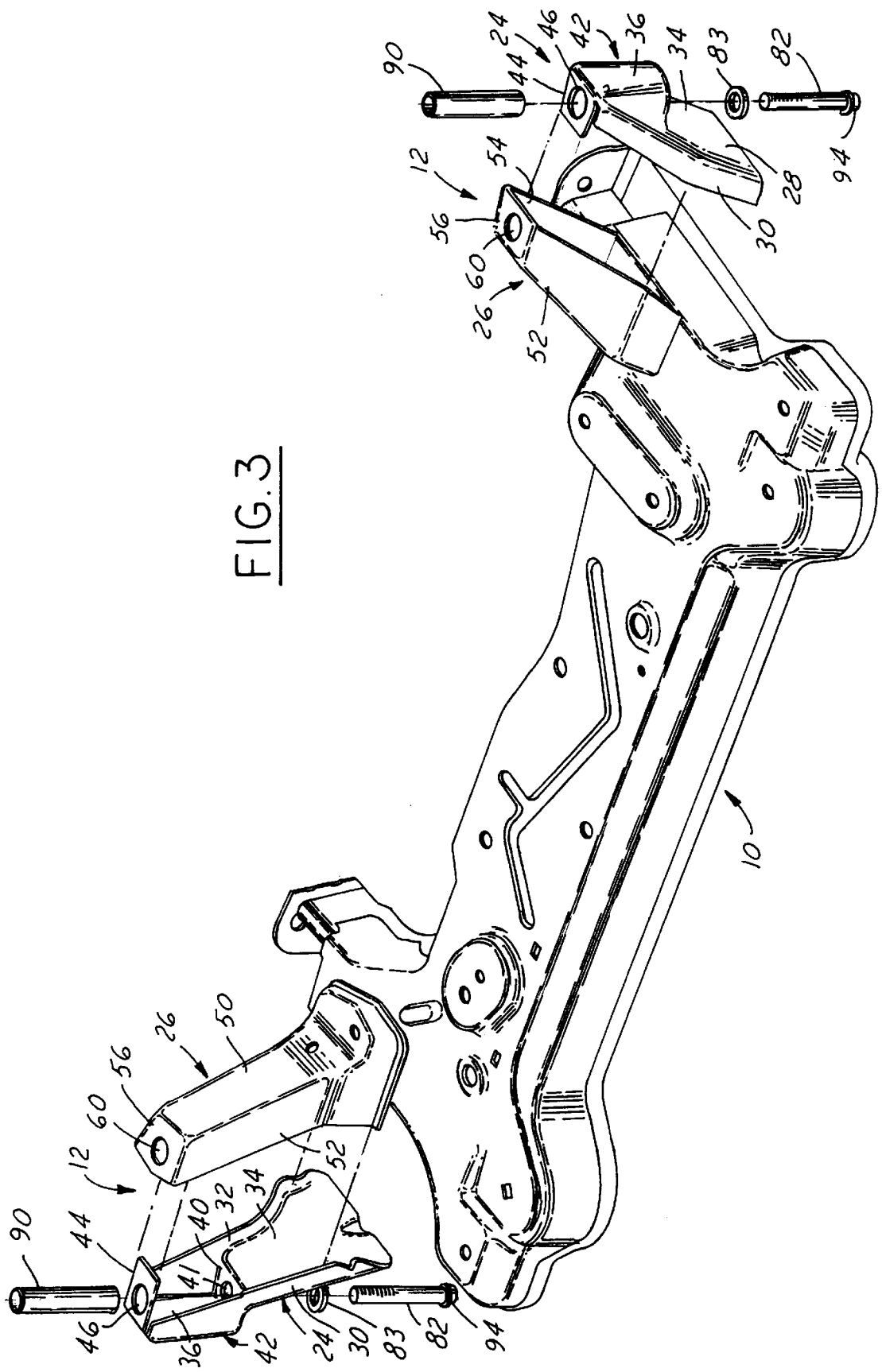
FIG. 3 is an exploded perspective view of the suspension cradle and towers, but with the various components normally carried by the suspension cradle removed for clarity.
Figure 4:
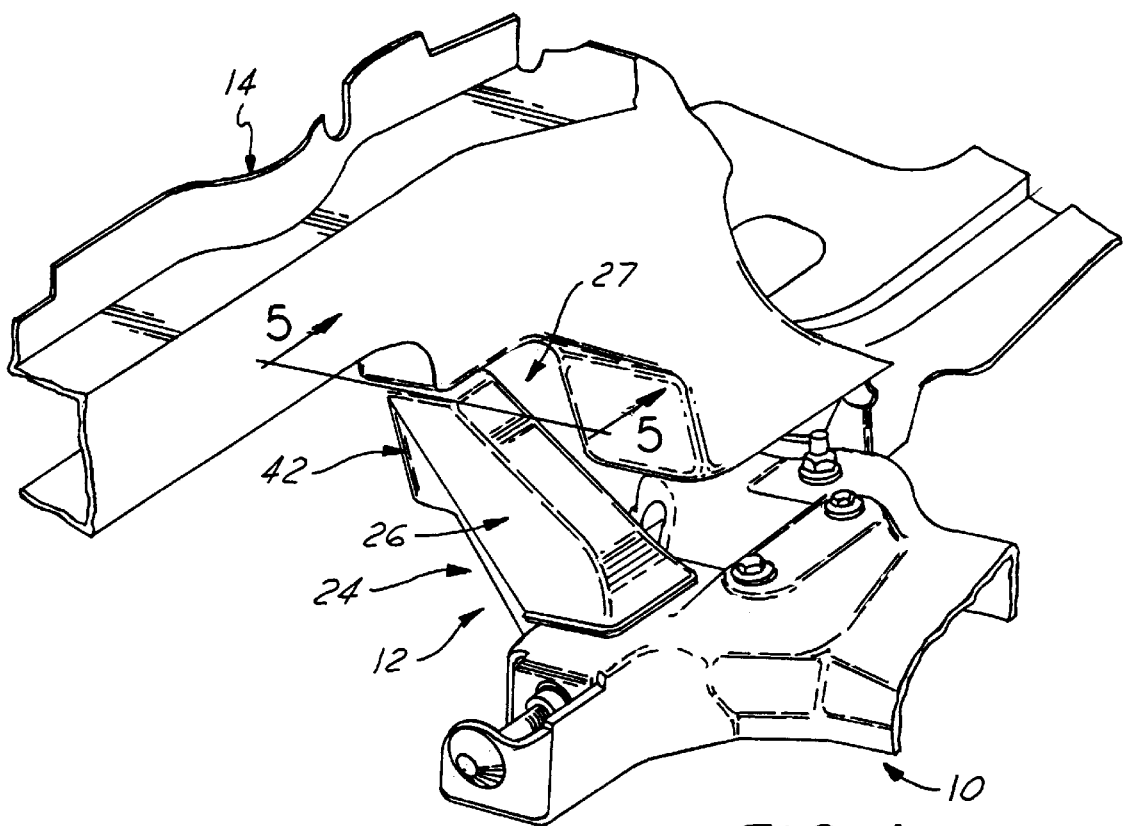
FIG. 4 is a fragmentary perspective view showing one of the towers attached to the frame of the vehicle.
Figure 5:
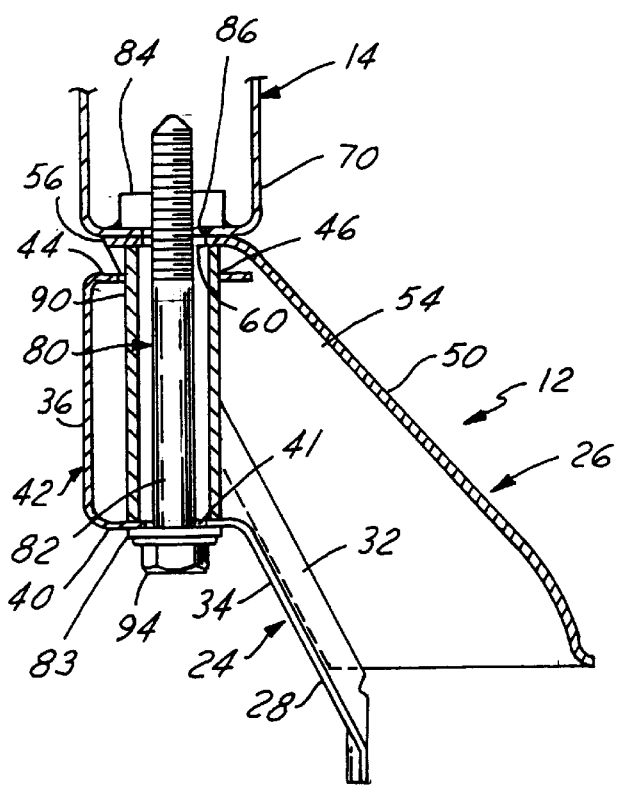
FIG. 5 is a sectional view taken on the line 5—5 in FIG. 4.

The towers 12 are similar in construction, each having two tower parts 24 and 26 secured together to form a hollow tower body 27(FIGS. 3 and 5). The laterally outer tower part 24 is generally channel-shaped, having a base 28 and spaced apart side walls 30 and 32 extending away from the base and in a direction toward the other tower part 26. The base 28 has a lower wall 34 and an upper wall 36 spaced from the lower wall 34 in a direction away from the other tower part 26. The lower and upper walls 34 and 36 are integrally connected by a horizontal flange 40. A central aperture 41 is formed in the flange 40. The upper wall 36 and flange 40 cooperate with the upper portions of the side walls 30 and 32 to define a pocket 42 which bulges laterally outwardly so that the underside is accessible for a purpose which will become more apparent as this description proceeds. The top of the pocket is closed by an integral horizontal flange 44 which is spaced above the flange 40 and extends laterally inwardly from the upper wall 36 of the base 28. A central aperture 46 is formed in the flange 44.

The laterally inner tower part 26 is generally channel-shaped, having a base 50 and spaced apart side walls 52 and 54 extending away from the base 50 in a direction toward the other tower part 24. The top of the tower part 26 is closed by an integral horizontal flange 56 integral with the upper edges of the side walls 52 and 54. A central aperture 60 is formed in the flange 56.

The two tower parts 24 and 26 open toward one another with the side walls 52 and 54 of the tower part 26 overlapping and rigidly secured as by welding to the side walls 30 and 32 of the tower part 24. Each tower 12 is welded or otherwise permanently secured to an end of the suspension cradle 10 with the bottom of the tower part 24 engaging an end of the suspension cradle and the bottom of the tower part 26 resting upon a top surface of the suspension cradle.

The flange 44 is spaced above the flange 40, and the flange 56 is spaced above the flange 44. The apertures 41, 46 and 60 in these flanges are aligned with one another, with the aperture in the flange 44 being substantially larger than the apertures in the other two flanges.

Referring to FIG. 5, each tower is secured to a frame member 70 of the frame 14 of the vehicle by a nut and bolt assembly 80 including a bolt 82 extending through all three apertures 41, 46 and 60, a washer 83, and a threaded anchor such as nut 84 preferably permanently attached to the frame member 70 in alignment with the apertures. The bolt extends through the apertures and through a hole 86 in the frame member 70 and threads into the nut and when tightened provides a secure and stiff attachment.

In order to prevent collapse of the flanges 40 and 56 when the bolt is tightened, a spacer tube 90 is provided (FIG. 5). The spacer tube 90 extends through the aperture 46 in the flange 44 and is sleeved on the bolt 82 and extends between the flanges 40 and 56 with its ends in contact with, but not secured to, such flanges. By being unsecured, and loose or floating in the tower body, the spacer tube is free to align with the apertures 41 and 60 in the flanges 40 and 56 and thus accommodate any slight possible misalignment of such apertures. The spacer tube extends through the enlarged aperture in the flange 44 but has a larger outside diameter than the apertures 41 and 60 in the flanges 40 and 56 so that it can be aligned in concentric relation therewith in contact with the portions of the flanges surrounding the apertures.

The apertured flange 44 through which the spacer tube 90 extends provides a means of supporting the spacer tube and preventing it from falling out of the tower body during assembly, shipping and installation.

The head 94 of the bolt 82 is disposed beneath the flange 40 and is in an exposed position readily accessible by a tool for tightening the in the nut 84. The bulging position of the pocket 42 makes it possible to gain access to the bolt head in a fast and easy manner.

The flanges 40 and 56 provide a double-shear attachment wherein each flange is loaded in shear. Such a construction is extremely stiff and strong and prevents vibration and resulting noise.

What is claimed is:

1. Apparatus for attaching a transverse suspension cradle to a rigid frame of an automotive vehicle comprising a first tower rigidly secured to a first end of said cradle and a second tower rigidly secured to a second end of said cradle, each of said towers comprising:

a hollow tower body having spaced substantially parallel flanges, generally aligned apertures in said flanges, and a bolt extending through said apertures and threaded into a threaded anchor on the frame of the vehicle.

2. Apparatus as defined in claim 1, further including a spacer extending between and engaging said flanges to prevent collapse of said flanges when said bolt is tightened and wherein said bolt, threaded anchor, spacer and flanges providing a double-shear attachment for said tower body.

3. Apparatus as defined in claim 2, wherein said spacer is a tube sleeved on said bolt.

4. Apparatus as defined in claim 3, wherein said tube is unattached to said flanges and free floating to align with said apertures.

5. Apparatus as defined in claim 4, further including means on said body supporting said tube to prevent it from falling out of said body during assembly, shipping and installation.

6. Apparatus as defined in claim 1, wherein said body is made of two parts, one of said flanges being integral with one of said parts and the other of said flanges being integral with the other of said parts, and said means for supporting said tube comprises a third flange integral with one of said parts and having an aperture through which said tube extends.

7. Apparatus for attaching a transverse suspension cradle to a rigid frame of an automotive vehicle comprising a first tower rigidly secured to a first end of said cradle and a second tower rigidly secured to a second end of said cradle, each of said towers comprising:

an upright hollow tower body, said body comprising a first generally upright, elongated, channel-shaped tower part having a base and laterally spaced first side walls, said body comprising a second generally upright, elongated, channel-shaped tower part having a base and laterally spaced second side walls, said channel-shaped tower parts opening toward one another with the side walls of one of said tower parts overlapping and rigidly secured to the side walls of the other of said tower parts, said first tower part having a first substantially horizontal flange, said second tower part having a second substantially horizontal flange spaced vertically above said first flange, generally aligned apertures in said flanges, a bolt extending through said apertures and threaded into a nut on the frame of the vehicle, and means for preventing collapse of said flanges when said bolt is tightened comprising an elongated spacer tube sleeved on said bolt and extending between and engaging said flanges; and wherein said bolt, nut, spacer tube and flanges provide a double-shear attachment for said body.

8. Apparatus as defined in claim 7, wherein said spacer tube is unattached to said flanges and free floating to align with said apertures.

9. Apparatus as defined in claim 8, further including a third horizontal flange integral with one of said parts and having an aperture through which said tube extends to prevent said tube from falling out of said body during assembly, shipping and installation.

10. Apparatus as defined in claim 9, wherein the base of said first tower part has a lower wall forming with lower portions of said first side walls a relatively shallow channel portion and has an upper wall spaced outwardly from said lower wall in a direction away from said second tower part to form with upper portions of said first side walls a relatively deep channel portion, said first flange is integral with and extends between and connects the upper and lower walls of the base of said first tower part, said third flange is integral with said first tower part and is spaced above said first flange and cooperates with said first flange and with the upper wall and the upper portions of the side walls of said first tower part in defining a pocket in which said spacer tube is disposed, and said second flange is integral with said second tower part and is disposed above said third flange.

* * * * *